United States Patent
Broyles et al.

(10) Patent No.: US 12,433,775 B2
(45) Date of Patent: Oct. 7, 2025

(54) CONSTRAINING MECHANISMS FOR SELECTIVE DEPLOYMENT AND ASSOCIATED METHODS

(71) Applicant: W. L. Gore & Associates, Inc., Newark, DE (US)

(72) Inventors: Michael R. Broyles, Flagstaff, AZ (US); Jerry J. Stastka, Flagstaff, AZ (US)

(73) Assignee: W. L. Gore & Associates, Inc., Newark, DE (US)

( * ) Notice: Subject to any disclaimer, the term of this patent is extended or adjusted under 35 U.S.C. 154(b) by 715 days.

(21) Appl. No.: 17/608,818

(22) PCT Filed: May 10, 2019

(86) PCT No.: PCT/US2019/031761
§ 371 (c)(1),
(2) Date: Nov. 4, 2021

(87) PCT Pub. No.: WO2020/231387
PCT Pub. Date: Nov. 19, 2020

(65) Prior Publication Data
US 2022/0296399 A1   Sep. 22, 2022

(51) Int. Cl.
*A61F 2/95* (2013.01)
(52) U.S. Cl.
CPC ......... *A61F 2/95* (2013.01); *A61F 2002/9511* (2013.01)
(58) Field of Classification Search
CPC ........................... A61F 2/95; A61F 2002/9511
See application file for complete search history.

(56) References Cited

U.S. PATENT DOCUMENTS

| | | | |
|---|---|---|---|
| 4,878,906 A * | 11/1989 | Lindemann | A61F 2/958 623/3.18 |
| 5,405,378 A | 4/1995 | Strecker | |
| 5,671,790 A | 9/1997 | Andersen et al. | |
| 6,224,627 B1 | 5/2001 | Armstrong et al. | |
| 6,302,891 B1 | 10/2001 | Nadal | |
| 6,315,792 B1 | 11/2001 | Armstrong et al. | |

(Continued)

FOREIGN PATENT DOCUMENTS

| | | |
|---|---|---|
| CA | 2456046 A1 | 12/1999 |
| CN | 102088928 A | 6/2011 |

(Continued)

OTHER PUBLICATIONS

International Search Report and Written Opinion received for PCT Patent Application No. PCT/US21/25919, mailed on Dec. 23, 2021, 20 pages.

(Continued)

*Primary Examiner* — Bruce E Snow

(57) ABSTRACT

Various aspects of the present disclosure are directed toward medical device deployment apparatuses, systems and methods. The apparatuses, systems and methods may include at least one constraining fiber arranged about a circumference of the medical device and a warp knit configured to separate to deploy the medical device to at least one intermediate constrained configuration and to a fully deployed configuration.

20 Claims, 8 Drawing Sheets

(56) References Cited

U.S. PATENT DOCUMENTS

| | | | |
|---|---|---|---|
| 6,315,795 B1 * | 11/2001 | Scarborough | A61B 17/1637 606/279 |
| 6,352,553 B1 | 3/2002 | Van et al. | |
| 9,375,215 B2 | 6/2016 | Cully et al. | |
| 9,427,307 B2 | 8/2016 | Pearson et al. | |
| 9,439,791 B2 | 9/2016 | Vong et al. | |
| 9,622,893 B2 | 4/2017 | Huser | |
| 9,717,612 B2 | 8/2017 | Dorn et al. | |
| 9,987,155 B1 | 6/2018 | Sondreaal | |
| 2002/0045930 A1 | 4/2002 | Burg et al. | |
| 2004/0122503 A1 | 6/2004 | Campbell et al. | |
| 2004/0243215 A1 | 12/2004 | Nelson | |
| 2005/0090890 A1 | 4/2005 | Wu et al. | |
| 2007/0038310 A1 | 2/2007 | Guetty | |
| 2007/0106364 A1 | 5/2007 | Buzzard et al. | |
| 2008/0255580 A1 | 10/2008 | Hoffman et al. | |
| 2009/0326640 A1 | 12/2009 | Yoshimura et al. | |
| 2010/0011976 A1 | 1/2010 | Armstrong et al. | |
| 2010/0030321 A1 | 2/2010 | Mach | |
| 2010/0152829 A1 | 6/2010 | Edelman et al. | |
| 2011/0218613 A1 | 9/2011 | Leopold et al. | |
| 2012/0046652 A1 | 2/2012 | Sokel | |
| 2012/0130475 A1 | 5/2012 | Shaw | |
| 2012/0259406 A1 | 10/2012 | Schreck et al. | |
| 2013/0123900 A1 | 5/2013 | Eblacas et al. | |
| 2013/0245745 A1 | 9/2013 | Vong et al. | |
| 2013/0289713 A1 | 10/2013 | Pearson et al. | |
| 2014/0148895 A1 | 5/2014 | King | |
| 2014/0180378 A1 | 6/2014 | Roeder | |
| 2014/0200649 A1 | 7/2014 | Essinger et al. | |
| 2014/0277363 A1 | 9/2014 | Armstrong et al. | |
| 2015/0081000 A1 | 3/2015 | Hossainy et al. | |
| 2015/0082595 A1 | 3/2015 | King | |
| 2015/0173753 A1 | 6/2015 | Spivey et al. | |
| 2015/0250630 A1 | 9/2015 | Irwin et al. | |
| 2016/0199207 A1 | 7/2016 | Treacy et al. | |
| 2017/0151079 A1 | 6/2017 | Shaw | |
| 2017/0189212 A1 | 7/2017 | Eller et al. | |
| 2017/0348099 A1 | 12/2017 | Mendelson et al. | |
| 2018/0280171 A1 | 10/2018 | Gloss et al. | |
| 2020/0368051 A1 | 11/2020 | Byrne et al. | |
| 2021/0386567 A1 | 12/2021 | Stastka | |
| 2021/0386569 A1 * | 12/2021 | Stastka | B07B 1/22 |
| 2022/0031485 A1 | 2/2022 | Ramirez et al. | |
| 2022/0211528 A1 | 7/2022 | Skelton | |
| 2022/0211529 A1 | 7/2022 | Skelton | |
| 2023/0099043 A1 | 3/2023 | Stastka | |
| 2023/0225891 A1 | 7/2023 | Stastka | |
| 2024/0299198 A1 | 9/2024 | Honeyfield | |

FOREIGN PATENT DOCUMENTS

| | | |
|---|---|---|
| CN | 103547235 A | 1/2014 |
| CN | 103945798 A | 7/2014 |
| CN | 105530895 A | 4/2016 |
| CN | 105899167 A | 8/2016 |
| CN | 106102596 A | 11/2016 |
| CN | 109688984 A | 4/2019 |
| EP | 0950385 A2 | 10/1999 |
| EP | 1087726 A1 | 4/2001 |
| EP | 2298248 A1 | 3/2011 |
| EP | 2735283 A1 | 5/2014 |
| EP | 2749251 B1 | 7/2016 |
| JP | 06-503734 A | 4/1994 |
| JP | 2000-503359 A | 3/2000 |
| JP | 2000-503559 A | 3/2000 |
| JP | 2002-518086 A | 6/2002 |
| JP | 2003-052833 A | 2/2003 |
| JP | 2005-270432 A | 10/2005 |
| JP | 2005-304792 A | 11/2005 |
| JP | 2006-510453 A | 3/2006 |
| JP | 2009-523565 A | 6/2009 |
| JP | 2018-501902 A | 1/2018 |
| JP | 2021-566524 A | 7/2022 |
| WO | 97/21402 A1 | 6/1997 |
| WO | 99/65420 A1 | 12/1999 |
| WO | 2007/084762 A2 | 7/2007 |
| WO | 2009/140861 A1 | 11/2009 |
| WO | 2016/115007 A1 | 7/2016 |
| WO | 2019/075069 A1 | 4/2019 |
| WO | 2019/240799 A1 | 12/2019 |
| WO | 2019/240800 A1 | 12/2019 |
| WO | 2020/068957 A1 | 4/2020 |
| WO | 2020/231387 A1 | 11/2020 |
| WO | 2021/173648 A1 | 9/2021 |

OTHER PUBLICATIONS

International Preliminary Report on Patentability received for PCT Patent Application No. PCT/US2019/031761, mailed on Nov. 25, 2021, 9 pages.
International Preliminary Report on Patentability received for PCT Patent Application No. PCT/US2019/031769, mailed on Nov. 25, 2021, 10 pages.
International Preliminary Report on Patentability received for PCT Patent Application No. PCT/US2019/031780, mailed on Nov. 25, 2021, 7 pages.
International Preliminary Report on Patentability received for PCT Patent Application No. PCT/US2019/052921, mailed on Apr. 8, 2021, 8 pages.
International Preliminary Report on Patentability received for PCT Patent Application No. PCT/US2019/054630, mailed on Apr. 15, 2021, 9 pages.
International Preliminary Report on Patentability received for PCT Patent Application No. PCT/US2019/054652, mailed on Apr. 15, 2021, 8 pages.
International Search Report and Written Opinion received for PCT Patent Application No. PCT/US2019/031761, mailed on Jan. 22, 2020, 11 pages.
International Search Report and Written Opinion received for PCT Patent Application No. PCT/US2019/031769, mailed on Jan. 23, 2020, 16 pages.
International Search Report and Written Opinion received for PCT Patent Application No. PCT/US2019/031780, mailed on Jan. 20, 2020, 8 pages.
International Search Report and Written Opinion received for PCT Patent Application No. PCT/US2019/052921, mailed on Jan. 29, 2020, 13 pages.
International Search Report and Written Opinion received for PCT Patent Application No. PCT/US2019/054630, mailed on Jan. 29, 2020, 11 pages.
International Search Report and Written Opinion received for PCT Patent Application No. PCT/US2019/054652, mailed on Jan. 29, 2020, 9 pages.
International Search Report and Written Opinion received for PCT Patent Application No. PCT/US21/19386, mailed on Jun. 18, 2021, 12 pages.
"About Denier" https://standardfiber.com/about-denier (Year: 2012).
"What is Denier" https://www.onlinefabricstore.com/makersmill/what-is-denier/ (Year: 2012).
Merriam-Wester online dictionary, "knit" definition, accessed on Aug. 24, 2023, https://www.merriam-webster.com/dictionary/knit (Year: 2023) (Year: 2023).
Beute et al., "Use of EN Snare device for successful repositioning of the newest self-expanding transcatheter heart valve", SAGE, vol. 6, No. 1, Dec. 2018, pp. 1-3.
European Search Report for EP Patent Application No. 23170894.2, Issued on Oct. 20, 2023, 10 pages.
International Preliminary Report on Patentability received for PCT Patent Application No. PCT/US2021/019386, mailed on Sep. 9, 2022, 9 pages.
International Preliminary Report on Patentability received for PCT Patent Application No. PCT/US2021/025919, mailed on Oct. 19, 2023, 13 pages.
International Preliminary Report on Patentability received for PCT Patent Application No. PCT/US2021/037311, mailed on Dec. 29, 2022, 8 pages.

(56) References Cited

OTHER PUBLICATIONS

International Search Report and Written Opinion received for PCT Patent Application No. PCT/US2021/037311, mailed on Sep. 30, 2021, 12 pages.

Lee et al., Sheath-assisted controlled deployment technique for Excluder bifurcated main body, Journal of Vascular Surgery, vol. 43, No. 5, May 2006, pp. 1060-1063.

Xiao-Dong et al., "A patent analysis of biodegradable vascular scaffolds", Chinese Journal of Tissue Engineering Research, vol. 22, No. 2, 2018, pp. 303-309.

Zhang et al., "Application of Knitting Structure Textiles in Medical Areas", Autex Research Journal, vol. 18, No. 2, Jun. 12, 2018, pp. 1-11.

* cited by examiner

CONSTRAINING MECHANISMS FOR SELECTIVE DEPLOYMENT AND ASSOCIATED METHODS

CROSS-REFERENCE TO RELATED APPLICATION

This application is a national phase application of PCT Application No. PCT/US2019/031761, internationally filed on May 10, 2019, which is herein incorporated by reference in its entirety for all purposes.

FIELD

The present disclosure relates to apparatuses, systems, and methods that include constraints used in delivery of implantable medical devices. More specifically, the present disclosure relates to apparatuses, systems, and methods that include constraints for staged deployment of an expandable device during device delivery.

BACKGROUND

Stents and stent-grafts may be utilized to radially support a variety of tubular passages in the body, including arteries, veins, airways, gastrointestinal tracts, and biliary tracts. The preferred method of placing these devices has been to use specialized delivery systems to precisely place and deploy a device at the site to be treated. These delivery systems allow the practitioner to minimize the trauma and technical difficulties associated with device placements. Attributes of delivery systems include: low profile; ability to pass through introducer sheaths; ability to negotiate tortuous vasculature, smoothly and atraumatically; protection of constrained devices; and ability to accurately position and deploy the device.

Stents or stent-grafts may be deployed and plastically deformed, such as by using an inflatable balloon or to self-expand, such as through elastic recovery from a collapsed or constrained delivery diameter to an expanded and deployed diameter. Some stents are designed to elastically recover by being manufactured at their functional diameter out of a material that has elastic recovery properties, and then radially compressed to be mounted on a delivery catheter.

These stent and stent-graft devices may be held, compressed, or constrained in the delivery configuration prior to and during delivery to a target location.

SUMMARY

According to one example ("Example 1"), a medical device deployment apparatus includes at least one constraining fiber arranged about a circumference of the medical device and including a series of multiple loops interwoven at a first location to form a warp knit with at least one of the multiple loops being arranged at least partially about the circumference of the medical device and joined together at a second location, the warp knit being configured to separate to deploy the medical device to at least one intermediate constrained configuration and to a fully deployed configuration.

According to another example ("Example 2"), further to the apparatus of Example 1, the at least one constraining fiber includes multiple constraining fibers interwoven to form the series of multiple loops.

According to another example ("Example 3"), further to the apparatus of Example 2, the series of multiple loops form a knot row at the first location and looped portions of the multiple loops extend at least partially about the circumference of the medical device and are joined together at the second location.

According to another example ("Example 4"), further to the apparatus of Example 3, the apparatus also includes a removeable constraint arranged through the looped portions of the multiple loops to join the looped portions together at the second location.

According to another example ("Example 5"), further to the apparatus of Example 4, the removeable constraint is configured to withdrawn from the looped portions of the multiple loops to deploy the medical device to the at least one intermediate constrained configuration.

According to another example ("Example 6"), further to the apparatus of any one of Examples 2-5, the at least one intermediate constrained configuration includes a first intermediate constrained configuration and a second intermediate constrained configuration, the multiple constraining fibers are joined at the second location and joined at a third location, and the multiple constraining fibers are configured to separate at the third location to deploy the medical device to the second intermediate constrained configuration and separate at the second location to deploy the medical device to the first intermediate constrained configuration.

According to another example ("Example 7"), further to the apparatus of Example 6, the apparatus also includes a second removeable constraint configured to join the multiple constraining fibers at the third location and wherein the removable constraint is configured to join the multiple constraining fibers at the second location.

According to another example ("Example 8"), further to the apparatus of Example 7, the second removeable constraint is arranged through looped portions of the multiple loops and the second removeable constraint is configured to withdrawn from the looped portions to separate multiple constraining fibers at the third location to deploy the medical device to the second intermediate constrained configuration.

According to another example ("Example 9"), further to the apparatus of any one of Examples 6-8, the multiple constraining fibers are configured to deploy to the first intermediate constrained configuration and arrange at least a portion of the medical device at a first intermediate diameter and to the second intermediate constrained configuration to arrange at least a portion of the medical device at a second intermediate diameter.

According to another example ("Example 10"), further to the apparatus of Example 9, the multiple constraining fibers are configured to deploy to the first intermediate constrained configuration and arrange end portions of the medical device at the first intermediate diameter and maintain an intermediate portion of the medical device at a constrained configuration.

According to another example ("Example 11"), further to the apparatus of any one of Examples 4-10, the removable constraint includes a linchpin.

According to another example ("Example 12"), further to the apparatus of any one of Examples 4-10, the removable constraint includes a fiber.

According to one example ("Example 13"), a method of forming a constraint for a medical device deployment apparatus includes arranging a constraining fiber about the medical device to form the constraint and place the medical device in a constrained configuration, the constraint including a constraining fiber arranged about a circumference of the medical device interwoven at a first location to form a knot row; forming a series of multiple loops with the constraining fiber after forming the knot row with the multiple loops being arranged at least partially about the circumference of the medical device from the knot row; and arranging a removeable constraint arranged through the multiple loops to hold the multiple loops.

According to another example ("Example 14"), further to the method of Example 13, arranging the constraining fiber about the medical device includes forming a warp knit including the knot row.

According to another example ("Example 15"), further to the method of Example, arranging the constraining fiber about the medical device in the knot row includes arranging the medical device at a first diameter and forming the series of multiple loops includes arranging the medical device at a second diameter that is less than the first diameter.

According to one example ("Example 16"), a medical device deployment apparatus includes an implantable medical device; a constraint arranged about a circumference of the implantable medical device and configured to releasably constrain the implantable medical device in a constrained configuration, the constraint including: a constraining fiber arranged about a circumference of the medical device interwoven at a first location to form a knot row and a series of multiple loops arranged at least partially about the circumference of the medical device from the knot row; and a removeable constraint arranged through the multiple loops and configured to be withdrawn from the multiple loops to release the constraint and the implantable medical device to an intermediate configuration.

According to another example ("Example 17"), further to the apparatus of Example 16, the knot row is configured to maintain at least a portion the medical device at a first diameter and the series of multiple loops includes arranging the medical device at a second diameter that is less than the first diameter.

According to another example ("Example 18"), further to the apparatus of Example 17, the knot row is configured to maintain end portions of the medical device at the first diameter and the series of multiple loops are configured to maintain a length of the medical device at a constrained configuration.

According to another example ("Example 19"), further to the apparatus of Example 17, the series of multiple loops are arranged 180 degrees about the circumference of the medical device from the knot row and the first diameter is approximately 50% greater than the second diameter.

According to another example ("Example 20"), further to the apparatus of Example 16, the knot row is configured to unknit to deploy the implantable medical device to a fully deployed configuration.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
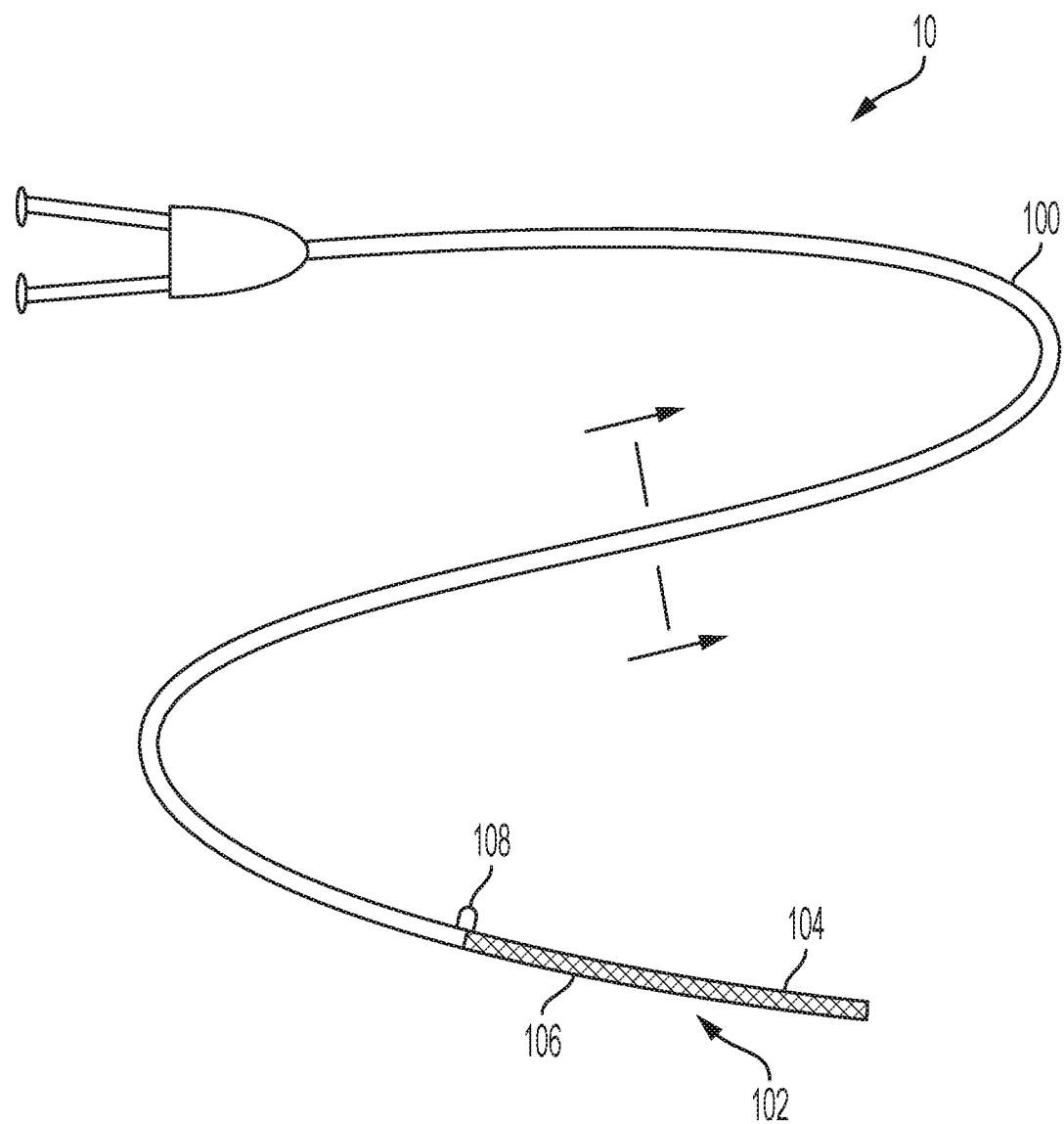
FIG. 1 is a top plan view of a delivery system including a catheter with a constraint, in accordance with an embodiment.

As the terms are used herein with respect to ranges of measurements "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

A coordinate system is presented in the Figures and referenced in the description in which the "Y" axis corresponds to a vertical direction, the "X" axis corresponds to a horizontal or lateral direction, and the "Z" axis corresponds to the interior/exterior direction.

Description of Various Embodiments

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Various aspects of the present disclosure are directed toward apparatuses, systems, and methods that include forming or manufacturing a constraint. The constraining mechanisms are configured to hold, compress, or constrain an implantable medical device (e.g., a stent, stent-graft, balloon, filter, or other expandable medical device) in a delivery configuration prior to and during delivery to a target location. In certain instances, constraints may include one or more fibers that are arranged together. The fibers may be interwoven, stitched, or otherwise interlocked together circumferentially about the device. To remove the constraint, one or more of the fibers may be unknitted or disrupted from the other fibers in the constraint.

Various aspects of the present disclosure are directed toward controlling deployment of the medical device using the constraint. In certain instances, it may be beneficial to deploy at least a portion of the medical device to an intermediate diameter that is larger than a constrained diameter. For example, a physician may deploy the medical device to the intermediate diameter and visualize the location of the medical device within a patient. The physician may adjust location or angle of the medical device at the intermediate diameter, and then deploy the medical device to another non-fully deployed diameter or fully deploy the device. As discussed in further detail below, the constraint may be formed by one or more constraining fibers that may be arranged to form a constraint that allows for staged deployment of an implantable device.

FIG. 1 is a top plan view of a catheter 100 with a constraint 102, according to some embodiments. As shown in FIG. 1, the constraint 102 is configured to constrain an implantable medical device 104 to a delivery configuration. The constraint 102 may include one or more fibers 106 arranged about the implantable medical device 104 to maintain the constraint 102 in a constrained configuration.

The constraint 102 is arranged along a length of the implantable medical device 104. The constraint 102 is also circumferentially arranged about the implantable medical device 104 and may substantially cover the implantable medical device 104 for delivery. The one or more fibers 106 may be arranged within a lumen (not shown) of the catheter 100 and extend toward a proximal end of the catheter 100 that is arranged external to a patient during delivery of the implantable medical device 104. The one or more fibers 106 include a proximal end 108 that a user may apply tension to in order to release the constraint 102 and deploy the implantable medical device 104.

In certain instances, the one or more fibers 106 release similar to a rip cord such that interlocking portions (e.g., overlapping fibers or knots) sequentially release along the length of the implantable medical device 104. As is explained in greater detail below, the constraint 102 is formed by interlocking together the one or more fibers 106 directly on the implantable medical device 104. As compared to prior multiple fiber constraints which are knitted together and then subsequently arranged about a constrained device, the constraint 102 is formed directly on the implantable medical device 104. The expandable medical device 104 may be a stent, stent-graft, a balloon, or a similar device.

Figure 2:
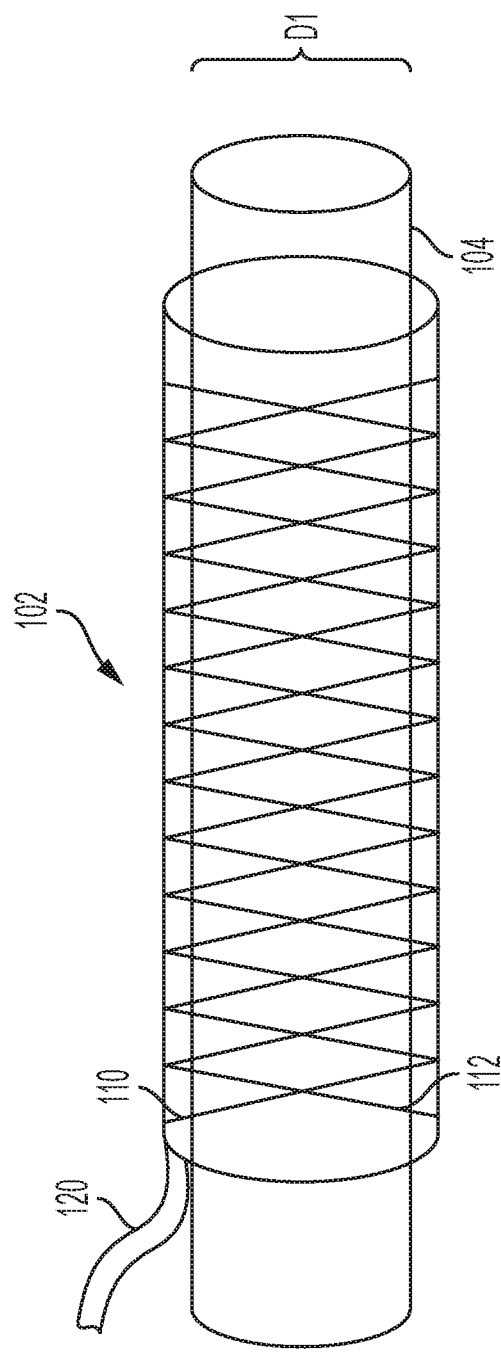
FIG. 2 is a side view of an implantable medical device including a constraint, in accordance with an embodiment.

FIG. 2 is a side view of the device 104 including the constraint 102, in accordance with an embodiment. As shown, the device 104 includes a delivery diameter D1 and a deployed diameter D2 (not shown) that is larger than the delivery diameter D1. The removable constraint 102 is attached to the device 104 at its delivery diameter D1. As shown, the constraint 102 includes at least two interlocking strands in the form of a warp knit. For example, the constraint 102 may include a first interlocking strand 110 and a second interlocking strand 112. The first and/or the second interlocking strand(s) 110, 112 may operate, for example, as a deployment line 120 configured to release the constraint 102 and transition the device 104 from the delivery diameter D1 to the deployed diameter D2 in response to a force applied to the deployment line 120 (which may be coupled to one or more of the knot rows 114 as discussed in further detail below).

The device 104 may have a desired deployed diameter D2 from about 5 mm-15 mm, or 6 mm-9 mm, or 6 mm-12 mm, 10 mm-20 mm, 15 mm-30 mm, 25 mm-45 mm, for example, and a delivery diameter D1 that is less than the deployed diameter D2. For example, in some instances, a ratio of the delivery diameter D1 of the device 104 to the deployed diameter D2 (not shown) of the device 104 is less than about 0.3, less than about 0.29, less than about 0.28, less than about 0.27, or less than about 0.26. For reference, the term "diameter" is not meant to require a circular cross-section, and is instead to be understood broadly to reference a maximum transverse cross-sectional dimension of a device 104.

Figure 3:
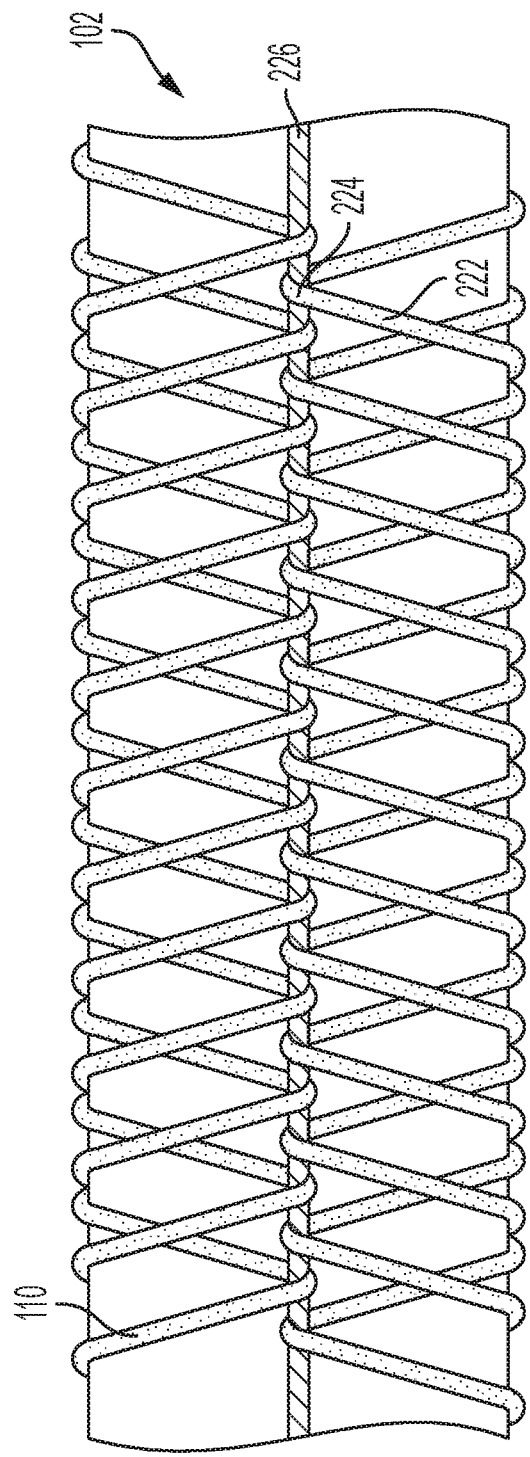
FIG. 3 is an illustration of an example constraint, in accordance with an embodiment.

FIG. 3 is an illustration of an example constraint 102, in accordance with an embodiment. The constraint 102 may be or form a part of a medical device (e.g., as shown in FIGS. 1-2) deployment apparatus. As shown in FIG. 3, the constraint 102 may include at least one constraining fiber 110 arranged about a circumference of the medical device. The constraining fiber 110 may form a series of multiple loops 222. A single one of the loops 222 is shown highlighted in FIG. 3 for ease of illustration.

The series of multiple loops 222 are interwoven at a first location to form a warp knit (as shown in further detail with reference to FIGS. 7-8). In addition, the multiple loops 222 may be interwoven together in a knot row. After being formed in a knot row, series of knots or seam, one or more loops 222 may be arranged at least partially about the circumference of the medical device and may be joined together at a second location as shown in FIG. 3. The warp knit is configured to separate to deploy the medical device to at least one intermediate constrained configuration and to a fully deployed configuration.

In certain instances, the loops 222 are held or joined on an opposite side or circumferentially opposite to that of the knot row. In other instances, the loops 222 may be wrapped circumferentially about the medical device to overlay or approximately overlay the knot row. The loops 222 may be wrapped any amount about the medical device from the knot row. In certain instances, the constraining fiber 110 is folded over to form the loops 222, which are knit together to form the knot row. The distal end portions of the loops 222 are looped portions 224. The looped portions 224 of the multiple loops 222 may extend at least partially about the circumference of the medical device to be joined together at the second location. To join the multiple loops 222 together, and more particularly the looped portions 224 of the multiple loops 222, a removable constraint 226 may be arranged through the looped portions 224.

As shown in FIG. 3, the removeable constraint 226 is arranged through the looped portions 224 of the multiple loops 222 to join the looped portions 224 together at the second location. In certain instances, the looped portions 224 of the multiple loops 222 may be interwoven together at the second location to join, the looped portions 224 of the multiple loops 222 may be adhered together using an adhesive at the second location to join, or the looped portions 224 of the multiple loops 222 may be tacked down to other portions of the constraining fiber 110 to join.

To form the constraint 102, the constraining fiber 110 may be arranged about the medical device to place the medical device in a constrained configuration. The constraining fiber 110 may be interwoven at the first location to form the knot row. The constraining fiber 110 may be formed into a series of loops 222, before or after being interwoven to form the knot row (e.g., the constraint 102 may be a warp knit pattern) The loops 222 may be then arranged at least partially about the circumference apart from the knot row. To join the loops 222, the removeable constraint 226 is through the multiple loops 222 to hold the multiple loops 222 at the second location.

The loops 222 being held together with the removeable constraint 226 configures the constraint 102 for staged deployment of a medical device. The loops 222 forming the knot row and being wrapped about the circumference of the medical device constrains the device to a further second diameter that is smaller than if the constraint 102 included a single knot row. The removeable constraint 226 holds the loops 222 and may be withdrawn to release the loops 222. Releasing the loops 222 expands the constraint 102 and the medical device to an intermediate diameter. The constraint 102 remains intact due to the knot row, which may be unraveled to fully deploy the medical device as is shown in further detail with reference to FIGS. 7-8.

In certain instances, arranging the constraining fiber 110 about the medical device in the knot row includes arranging the medical device at a first diameter and forming the series of multiple loops 222 includes arranging the medical device at a second diameter that is less than the first diameter (e.g., as shown in further detail in FIGS. 7-8). Forming the constraint 102 in this manner may form a staged deployment constraint 102. The constraining fiber 110 may be wrapped a first time about the medical device when forming the knot row and a second time (or a part of a rotation) with the loops 222. Thus, the loops 222 may fully constrain the device and when the releasable constraint 226 is withdrawn, the knot row may release the device to an intermediate diameter that is twice the fully constrained diameter. The difference in diameters may depend on the amount of wrapping of the constraining fiber 110. In addition, the constraining fiber 110 may wrap about portions of the medical device such that those portions of the device may deployed to an intermediate diameter. Further, the constraining fiber 110 and the removable constraint 226 may be one of a number of constraining fibers 110 and removable constraints 226 in a constraint 102.

In certain instances, the loops 222 are arranged 180 degrees about the circumference of the medical device from the knot row and the first diameter is approximately 50% greater than the second diameter. In addition, the removeable constraint 226 may be a linchpin (e.g., metal or metallic) or the removeable constraint 226 may be a fiber.

Figure 4:
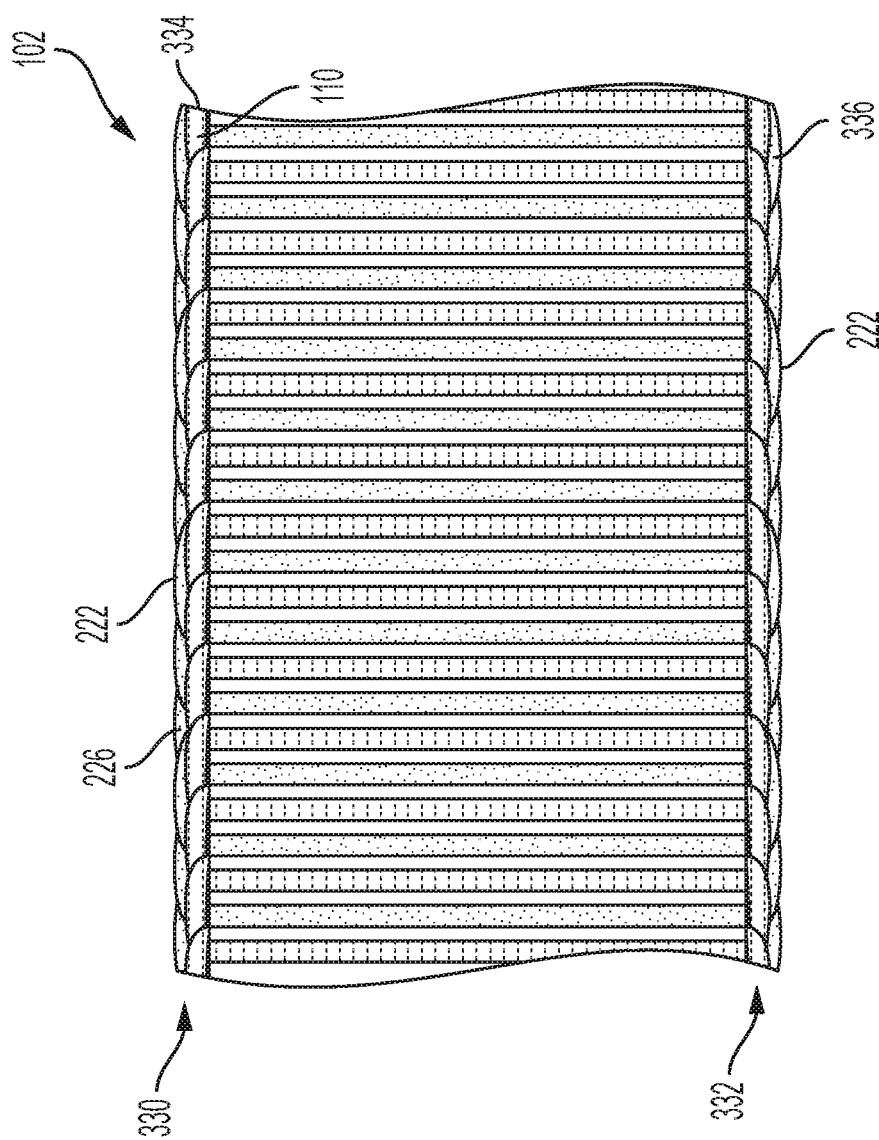
FIG. 4 is an illustration of another example constraint, in accordance with an embodiment.

FIG. 4 is an illustration of another example constraint 102, in accordance with an embodiment. The constraint 102 includes a constraining fiber 110 that is arranged in a warp knit pattern about a medical device. The constraining fiber 110 includes a first row of knots 330 and a second row of knots 332. The first row of knots 330 is arranged on diametrically opposing side of the constraint 102 as the second row of knots 332.

In certain instances, the constraining fiber 110 is wrapped circumferentially about a medical device and interwoven together at a first location and a second location to form the first row of knots 330 and the second row of knots 332. The first row of knots 330 may be arranged on diametrically opposing side of the constraint 102 as the second row of knots 332 such that the constraint 102 is configured for staged deployment.

A removeable constraint 226 is arranged through looped portions 222 of the first row of knots 330 and the second row of knots 332. Tension may be applied to a distal end 334 to withdraw the removable constraint 226. In response to tension applied to the distal end 334 of the removeable constraint 226 (which may be accessible to a physician), the removeable constraint 226 may unravel or uncouple from the first row of knots 330 and the second row of knots 332. In certain instances, the removeable constraint 226 is withdrawn through the second row of knots 332 prior to the first row of knots 330. In other instances, the removeable constraint 226 is withdrawn through the second row of knots 332 simultaneously to the first row of knots 330.

In certain instances, the removeable constraint 226 is withdrawn through the first row of knots 330 and the second row of knots 332 to enable the medical device to expand to a diameter that is larger than the constrained diameter. The constrained diameter of the constraint 102 is the minimal diameter of the medical device when arranged in the constraint 102 and when the removeable constraint 226 is arranged through the looped portions 222 of the first row of knots 330 and through and the looped portions 222 of the second row of knots 332. In certain instances, the removeable constraint 226 is withdrawn through the first row of knots 330 to enable the medical diameter to expand to a first intermediate diameter, and withdrawn through the second row of knots 332 to enable the medical diameter to expand a second intermediate diameter (larger than the first intermediate diameter) as shown in further detail with reference to FIGS. 7-8.

After the removeable constraint 226 is withdrawn through the first row of knots 330 and the second row of knots 332, the constraint 102 may be unraveled to enable the medical device to expand to a fully deployed diameter. A deployment line 336 may be coupled to the constraining fiber 110 (or the constraining fiber 110 may include a distal end accessible to a physician. Tension applied to the deployment line 336 may unravel the constraint 102. In certain instances, tension applied to the deployment line 336 may unknit or unravel the first row of knots 330 and the second row of knots 332 to enable the medical device to expand to the fully deployed diameter.

Figure 5:
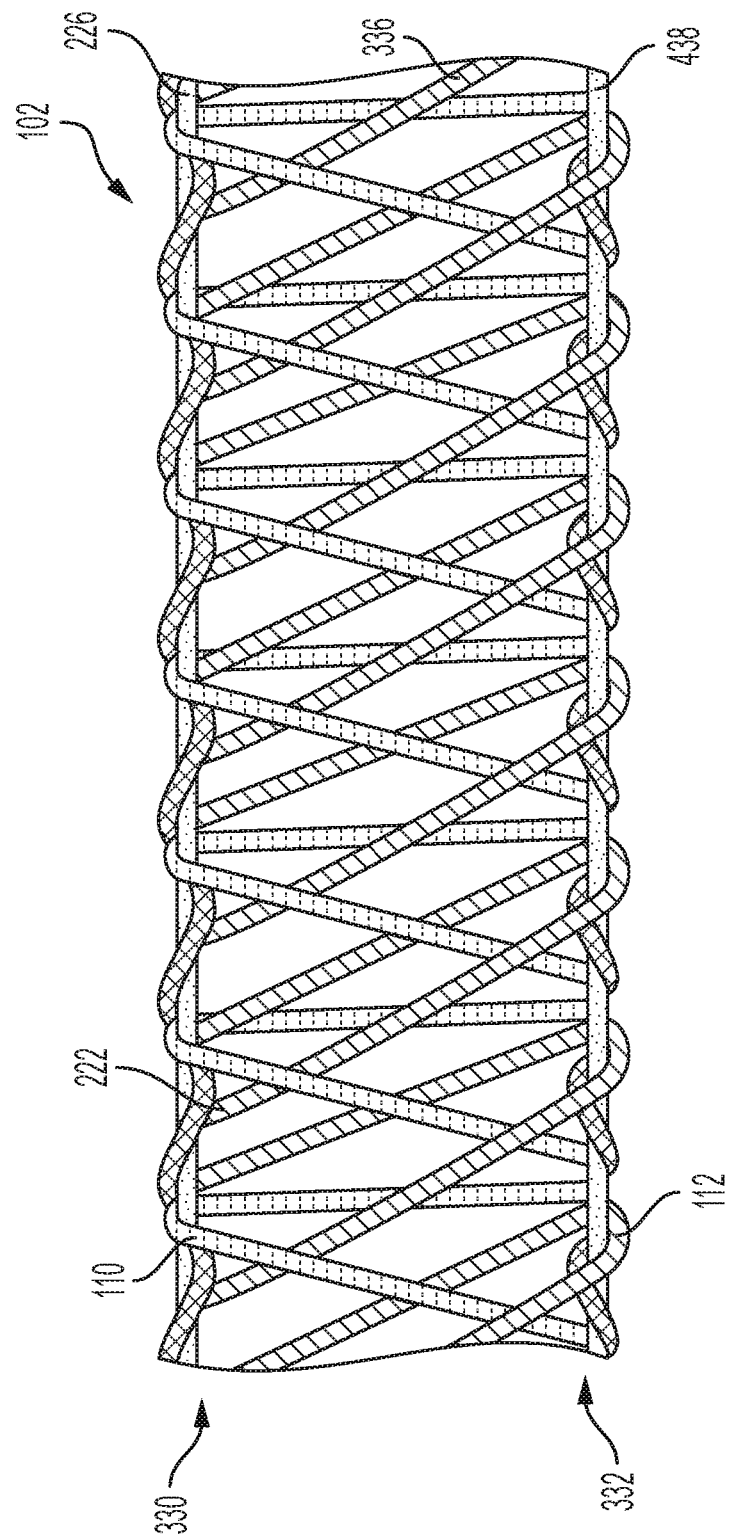
FIG. 5 is an illustration of another example constraint, in accordance with an embodiment.

FIG. 5 is an illustration of another example constraint 102, in accordance with an embodiment. The constraint 102 includes a first constraining fiber 110 and a second constraining fiber 112 arranged in a warp knit pattern about a medical device. The first constraining fiber 110 and the second constraining fiber 112 include at least a first row of knots 330 and a second row of knots 332. The first row of knots 330 is arranged on diametrically opposing side of the constraint 102 as the second row of knots 332. In certain instances, the first constraining fiber 110 and the second constraining fiber 112 may form additional rows of knots arranged at diametrically different portions of the constraint 102.

In certain instances, the first constraining fiber 110 and the second constraining fiber 112 are wrapped circumferentially about a medical device to and interwoven together at a first location and a second location to form the first row of knots 330 and the second row of knots 332 (which each may include looped portions 222).

As shown in FIG. 5, a first removeable constraint 226 is arranged through portions of the first row of knots 330 and a second removeable constraint 438 is arranged through the second row of knots 332. Tension may be applied to distal ends of each of the first removable constraint 226 and the second removeable constraint 338 to individually withdrawn the first removable constraint 226 and the second removeable constraint 338. In response to tension applied to the distal ends (which may be accessible to a physician), the first removable constraint 226 and the second removeable constraint 338 may withdraw from the first row of knots 330 and the second row of knots 332.

In certain instances, the first removable constraint 226 and the second removeable constraint 338 are withdrawn to enabled staged deployment of the medical device. The first removeable constraint 226 is withdrawn through the first row of knots 330 to enable the medical device to expand to a first intermediate diameter that is larger than the constrained diameter. The constrained diameter of the constraint 102 is the minimal diameter of the medical device when arranged in the constraint 102 and when the first removeable constraint 226 and the second removable constraint 338 are arranged through the first row of knots 330 and through and the second row of knots 332. To enable a second stage of deployment, the second removeable constraint 338 is withdrawn through the second row of knots 332 to enable the medical diameter to expand to a second intermediate diameter (larger than the first intermediate diameter) as shown in further detail with reference to FIGS. 7-8.

After the first removeable constraint 226 is withdrawn through the first row of knots 330 and the second removeable constraint 338 is withdrawn through the second row of knots 332, the constraint 102 may be unraveled to enable the medical device to expand to a fully deployed diameter. A deployment line 336 may be coupled to the first constraining fiber 110, the second constraining fiber 112, both of the first constraining fiber 110 and the second constraining fiber 112, or the first constraining fiber 110 and the second constraining fiber 112 may be couple together to form the deployment line 336. The deployment line 336 may include a distal end accessible to a physician. Tension applied to the deployment line 336 may unravel the constraint 102. In certain instances, tension applied to the deployment line 336 may unknit or unravel the first row of knots 330 and the second row of knots 332 to enable the medical device to expand to the fully deployed diameter.

Figure 6:
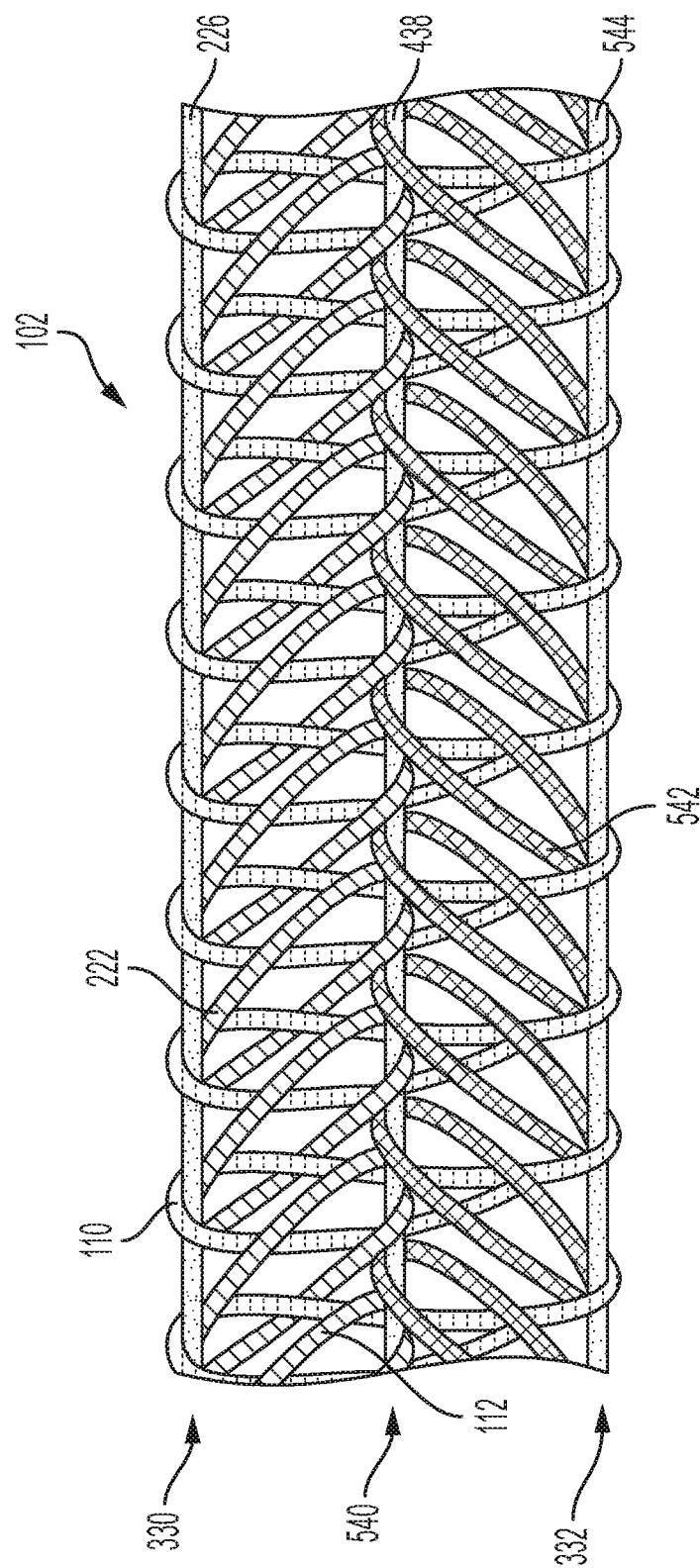
FIG. 6 is an illustration of another example constraint, in accordance with an embodiment.

FIG. 6 is an illustration of another example constraint 102, in accordance with an embodiment. The constraint 102 includes a first constraining fiber 110, a second constraining fiber 112, and a third constraining fiber 542 arranged in a warp knit pattern about a medical device. The constraining fibers 110, 112, 542 include at least a first row of knots 330, a second row of knots 332, and a third row of knots 540. The rows of knots 330, 332, 540 (which each may include looped portions 222) are arranged at diametrically different positions of the constraint 102.

As shown in FIG. 6, a first removeable constraint 226 is arranged through portions of the first row of knots 330, and a second removeable constraint 338 is arranged through the second row of knots 332, and a third removable constraint 542 is arranged through the third row of knots 540. Tension may be applied to distal ends of each of the first removable constraint 226, the second removeable constraint 338, and the third removable constraint 542 to individually withdrawn the first removable constraint 226, the second removeable constraint 338, and the third removable constraint 542.

In certain instances, each of the first removable constraint 226, the second removeable constraint 338, and the third removable constraint 542 are withdrawn to enabled staged deployment of the medical device. The first removeable constraint 226 is withdrawn through the first row of knots 330 to enable the medical device to expand to a first intermediate diameter that is larger than the constrained diameter. To enable a second stage of deployment, the second removeable constraint 338 is withdrawn through the second row of knots 332 to enable the medical diameter to expand to a second intermediate diameter (larger than the first intermediate diameter). To enable a third stage of deployment, the third removeable constraint 544 is withdrawn through the third row of knots 540 to enable the medical diameter to expand to a third intermediate diameter (larger than the first intermediate diameter and the second intermediate diameter) as shown in further detail with reference to FIGS. 7-8.

After the removeable constraints 226, 438, 544 are withdrawn, the constraint 102 may be unraveled to enable the medical device to expand to a fully deployed diameter.

Figure 7C:
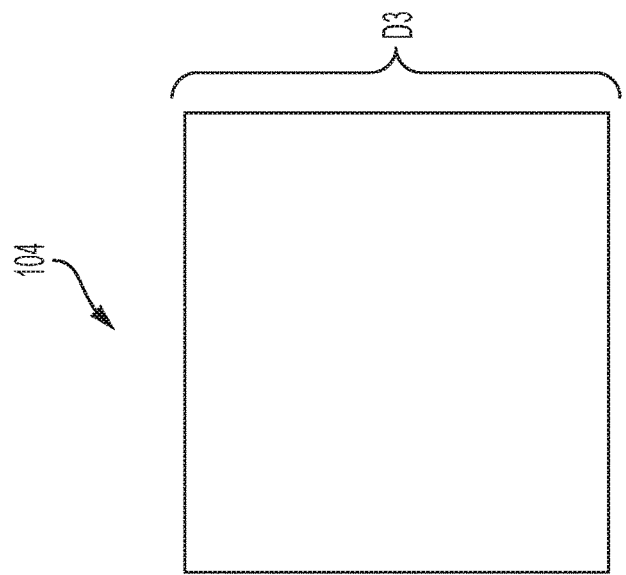
FIG. 7A-7C show illustrations of stages of deployment of an implantable medical device using a constraint, in accordance with an embodiment.
Figure 7B:
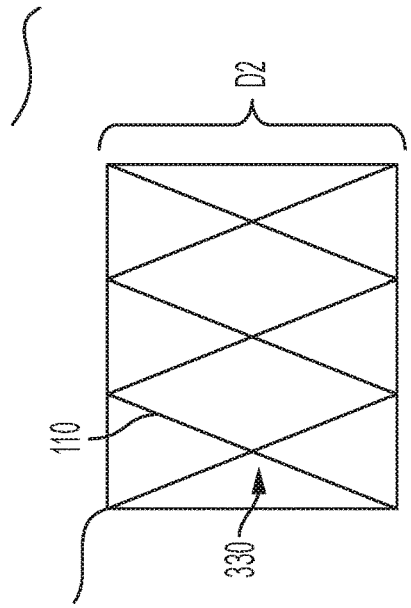
Figure 7A:
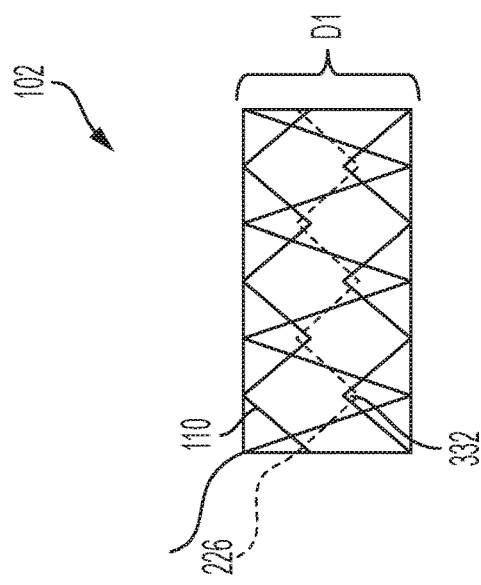

FIGS. 7A-C show illustrations of stages of deployment of an implantable medical device using a constraint 102, in accordance with an embodiment. The constraint 102 arranged about a circumference of the implantable medical device 104 (shown in FIG. 7C) and configured to releasably constraint the medical device 104 in a constrained configuration as shown in FIG. 7A. The constrained configuration arranges the medical device at a first diameter D1. The constraint 102 may be any one of the constraints shown in FIGS. 3-6, the constraint 102 includes at least one constraining fiber 110 arranged about a circumference of the medical device 104. The (at least one) constraining fiber 110 is interwoven at a first location to form a knot row 330 and a series of multiple loops 332 arranged at least partially about the circumference of the medical device 104 from the knot row 330. In certain instances, the multiple loops 332 may be a second knot row (e.g., each knot row includes loops 222) as described in further detail above with reference to FIGS. 3-6.

A removable constraint 226 is arranged through the multiple loops 332 (e.g., second knot row). The removable constraint 226 is configured to be withdrawn from the multiple loops 332 to release the constraint 102 and the implantable medical device 104 to an intermediate configuration. As shown in FIG. 7B, the implantable medical device 104 (and the constraint 102) is expanded to a second diameter D2 in the intermediate configuration. The second diameter D2 is larger than the first diameter D1.

In certain instances and as noted above, the intermediate constrained configuration, as shown in FIG. 7B includes a first intermediate constrained configuration and a second intermediate constrained configuration. In these instances, the constraining fiber 110 (or constraining fibers) may be joined at a second location and joined at a third location. In these instances, the constraining fiber 110 or fibers are configured to separate at the third location to deploy the medical device 104 to the second intermediate constrained configuration and separate at the second location to deploy the medical device 104 to the first intermediate constrained configuration.

To deploy the medical device 104 in this manner, a second removeable constraint is configured to join the constraining fiber 110 or multiple constraining fibers at the third location and the removable constraint is configured to join the multiple constraining fibers at the second location. The second removeable constraint is arranged through looped portions of the loops and the second removeable constraint is configured to be withdrawn from the looped portions to separate the constraining fiber 110 or multiple constraining fibers at the third location to deploy the medical device 104 to the second intermediate constrained configuration. The constraining fiber 110 or multiple constraining fibers are configured to deploy to the first intermediate constrained configuration and arrange at least a portion of the medical device at a first intermediate diameter and to the second intermediate constrained configuration to arrange at least a portion of the medical device 104 at a second intermediate diameter.

As shown in FIG. 7B, the knot row 130 (or knot rows as discussed above with reference to FIGS. 5-6) maintains the constraint 102 intact after the removable constraint 226 (or constrains as discussed above with reference to FIGS. 5-6) is withdrawn. The knot row 330 is configured to unknit to deploy the implantable medical device 110 to a fully deployed configuration (and to a third diameter D3) as shown in FIG. 7C.

Figure 8C:
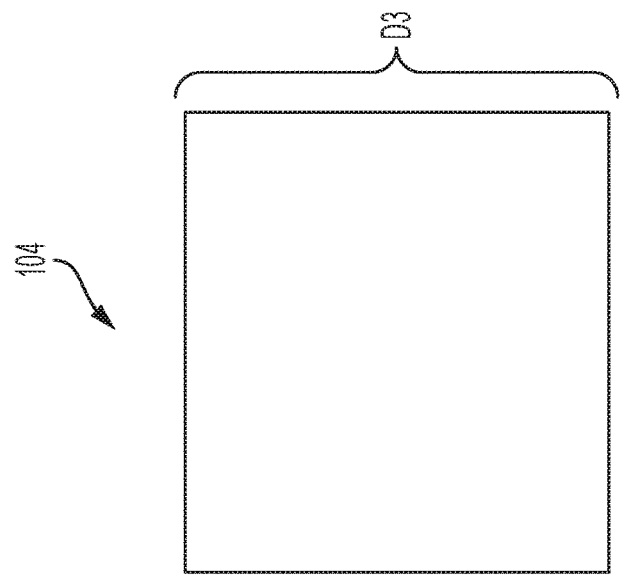
FIG. 8A-8C show illustrations of stages of deployment of an implantable medical device using a constraint, in accordance with an embodiment.
Figure 8B:
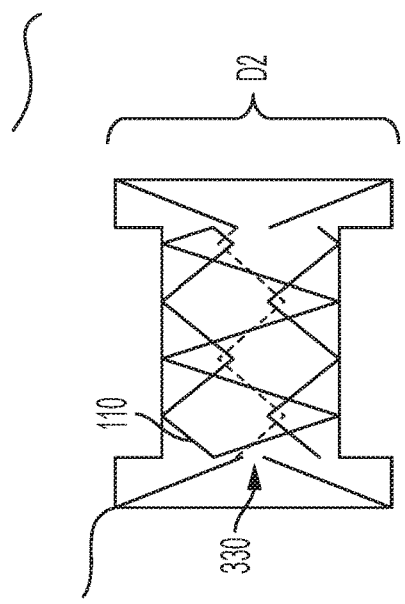
Figure 8A:
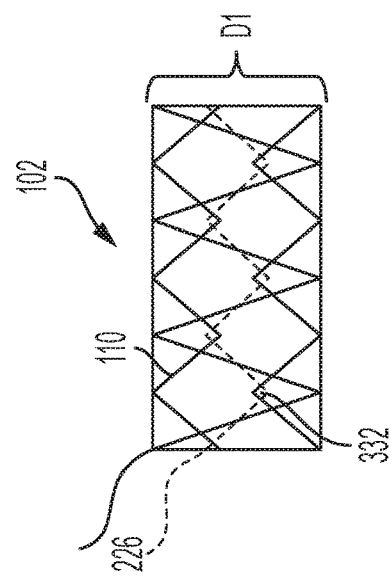

FIGS. 8A-C show illustrations of stages of deployment of an implantable medical device using a constraint 102, in accordance with an embodiment. The constraint 102 arranged about a circumference of the implantable medical device 104 (shown in FIG. 8C) and configured to releasably constrain the medical device 104 in a constrained configuration as shown in FIG. 8A. The constrained configuration arranges the medical device at a first diameter D1. The constraint 102 may be any one of the constrains shown in FIGS. 3-6, the constraint 102 includes at least one constraining fiber 110 arranged about a circumference of the medical device 104. The (at least one) constraining fiber 110 is interwoven at a first location to form a knot row 330 and a series of multiple loops 332 arranged at least partially about the circumference of the medical device 104 from the knot row 330. In certain instances, the multiple loops 332 may be a second knot row (e.g., each knot row includes loops 222) as described in further detail above with reference to FIGS. 3-6.

A removable constraint 226 is arranged through the multiple loops 332 (e.g., second knot row). The removable constraint 226 is configured to be withdrawn from the multiple loops 332 to release the constraint 102 and the implantable medical device 104 to an intermediate configuration. As shown in FIG. 7B, end portions of the implantable medical device 104 (and the constraint 102) is expanded to a second diameter D2 in the intermediate configuration. The second diameter D2 is larger than the first diameter D1. In certain instances, the constraining fiber 110 or multiple constraining fibers are configured to deploy the implantable medical device 104 to the first intermediate constrained configuration and arrange end portions of the medical device at the first intermediate diameter and maintain an intermediate portion of the medical device at a constrained configuration (and at diameter D1). The knot row 330 is configured to maintain end portions of the medical device at the first diameter and the series of multiple loops are configured to maintain a length of the medical device at a constrained configuration.

As shown in FIG. 8B, the knot row 130 (or knot rows as discussed above with reference to FIGS. 5-6) maintains the constraint 102 intact after the removable constraint 226 (or constrains as discussed above with reference to FIGS. 5-6) is withdrawn. The knot row 330 is configured to unknit to deploy the implantable medical device 110 to a fully deployed configuration (and to a third diameter D3) as shown in FIG. 8C.

The inventive concepts of this application have been described above both generically and with regard to specific embodiments. It will be apparent to those skilled in the art that various modifications and variations can be made in the embodiments without departing from the scope of the disclosure. Thus, it is intended that the embodiments cover the modifications and variations of the inventive concepts provided they come within the scope of the appended claims and their equivalents.

What is claimed is:

1. A medical device deployment apparatus, the apparatus comprising:
   at least one constraining fiber arranged about a circumference of the medical device and including:
      a series of multiple loops interwoven at a first location to form a knit along a longitudinal length of the medical device deployment apparatus with at least one of the multiple loops being arranged at least partially about the circumference of the medical device and joined together at a second location, the knit being configured to separate to deploy the medical device to at least one intermediate constrained configuration having an intermediate deployment diameter along the longitudinal length of the medical device deployment apparatus and to a fully deployed configuration having a deployed diameter that is greater than the intermediate deployment diameter along the longitudinal length of the medical device deployment apparatus.

2. The apparatus of claim 1, wherein the at least one constraining fiber comprises multiple constraining fibers interwoven to form the series of multiple loops.

3. The apparatus of claim 2, wherein the series of multiple loops form a knot row at the first location and looped portions of the multiple loops extend at least partially about the circumference of the medical device and are joined together at the second location.

4. The apparatus of claim 3, further comprising a removeable constraint arranged through the looped portions of the multiple loops to join the looped portions together at the second location.

5. The apparatus of claim 4, wherein the removeable constraint is configured to withdrawn from the looped portions of the multiple loops to deploy the medical device to the at least one intermediate constrained configuration.

6. The apparatus of claim 2, wherein the at least one intermediate constrained configuration includes a first intermediate constrained configuration and a second intermediate constrained configuration, the multiple constraining fibers are joined at the second location and joined at a third location, and the multiple constraining fibers are configured to separate at the third location to deploy the medical device to the second intermediate constrained configuration and separate at the second location to deploy the medical device to the first intermediate constrained configuration.

7. The apparatus of claim 6, further comprising a second removeable constraint configured to join the multiple constraining fibers at the third location and wherein the removable constraint is configured to join the multiple constraining fibers at the second location.

8. The apparatus of claim 7, wherein the second removeable constraint is arranged through looped portions of the multiple loops and the second removeable constraint is configured to withdrawn from the looped portions to separate multiple constraining fibers at the third location to deploy the medical device to the second intermediate constrained configuration.

9. The apparatus of claim 6, wherein the multiple constraining fibers are configured to deploy to the first intermediate constrained configuration and arrange at least a portion of the medical device at a first intermediate diameter and to the second intermediate constrained configuration to arrange at least a portion of the medical device at a second intermediate diameter.

10. The apparatus of claim 9, wherein the multiple constraining fibers are configured to deploy to the first intermediate constrained configuration and arrange end portions of the medical device at the first intermediate diameter and maintain an intermediate portion of the medical device at a constrained configuration.

11. The apparatus of claim 4, wherein the removable constraint comprises a linchpin.

12. The apparatus of claim 4, wherein the removable constraint comprises a fiber.

13. A method of forming a constraint for a medical device deployment apparatus, the method comprising:
arranging a constraining fiber about the medical device to form the constraint and place the medical device in a constrained configuration, the constraint including a constraining fiber arranged about a circumference of the medical device interwoven at a first location to form a knot row;
forming a series of multiple loops with the constraining fiber after forming the knot row with the multiple loops being arranged at least partially about the circumference of the medical device from the knot row; and
arranging a removeable constraint arranged through the multiple loops to hold the multiple loops.

14. The method of claim 13, wherein arranging the constraining fiber about the medical device includes forming a knit including the knot row.

15. The method of claim 13, wherein arranging the constraining fiber about the medical device in the knot row includes arranging the medical device at a first diameter and forming the series of multiple loops includes arranging the medical device at a second diameter that is less than the first diameter.

16. A medical device deployment apparatus, the apparatus comprising:
an implantable medical device;
a constraint arranged about a circumference of the implantable medical device and configured to releasably constrain the implantable medical device in a constrained configuration, the constraint including:
a constraining fiber arranged about a circumference of the medical device interwoven at a first location to form a knot row and a series of multiple loops arranged at least partially about the circumference of the medical device from the knot row; and
a removeable constraint arranged through the multiple loops and configured to be withdrawn from the multiple loops to release the constraint and the implantable medical device to an intermediate configuration.

17. The apparatus of claim 16, wherein the knot row is configured to maintain at least a portion the medical device at a first diameter and the series of multiple loops includes arranging the medical device at a second diameter that is less than the first diameter.

18. The apparatus of claim 17, wherein the knot row is configured to maintain end portions of the medical device at the first diameter and the series of multiple loops are configured to maintain a length of the medical device at a constrained configuration.

19. The apparatus of claim 17, wherein the series of multiple loops are arranged 180 degrees about the circumference of the medical device from the knot row and the first diameter is approximately 50% greater than the second diameter.

20. The apparatus of claim 16, wherein the knot row is configured to unknit to deploy the implantable medical device to a fully deployed configuration.

* * * * *